INVENTOR.
FRANK S. WILDE
BY
ATTORNEYS

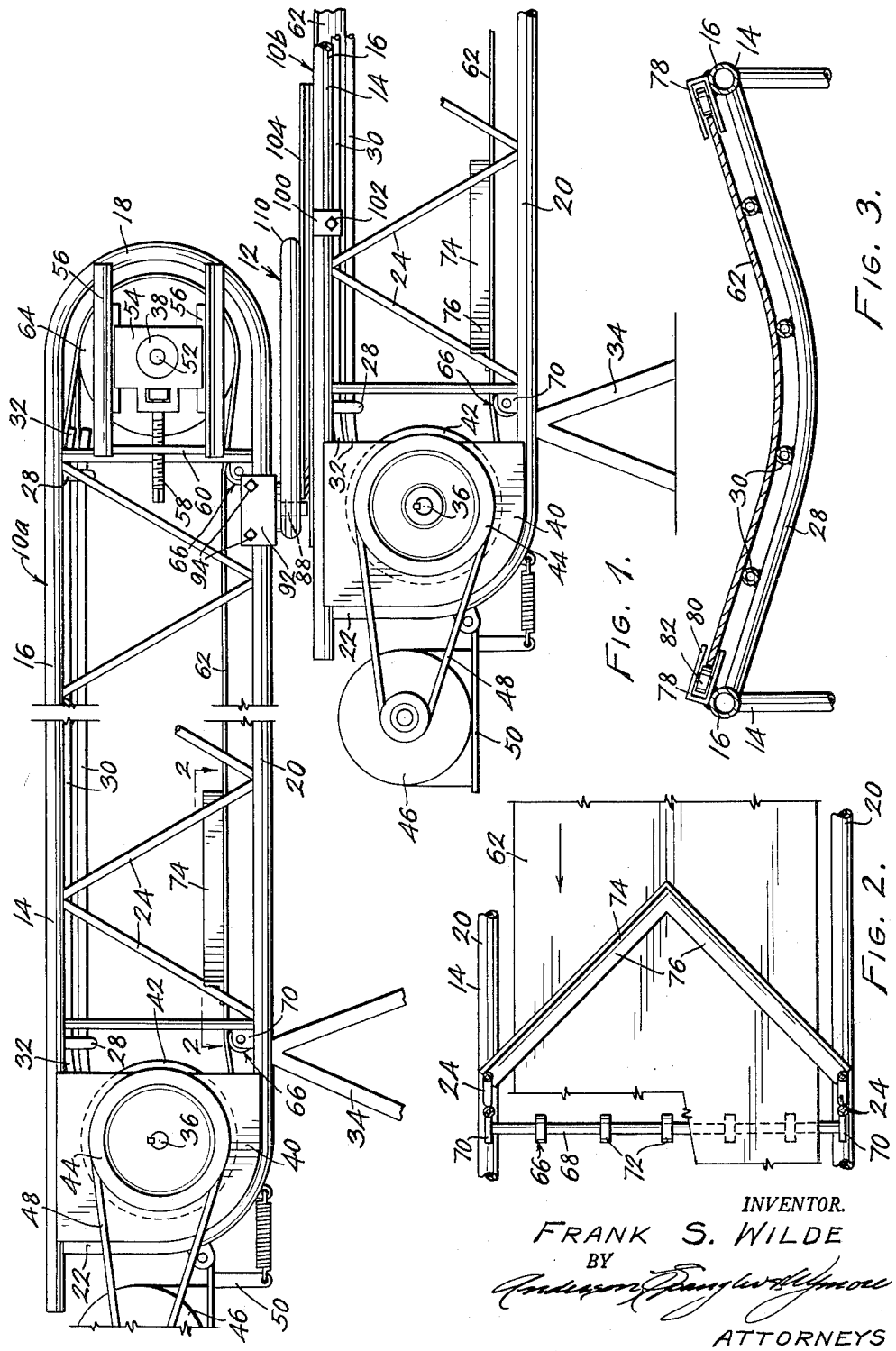

Jan. 16, 1962  F. S. WILDE  3,017,012
PORTABLE CONVEYOR ASSEMBLY
Filed Sept. 4, 1959  3 Sheets-Sheet 3

INVENTOR.
FRANK S. WILDE
BY
ATTORNEYS

United States Patent Office 3,017,012
Patented Jan. 16, 1962

3,017,012
PORTABLE CONVEYOR ASSEMBLY
Frank S. Wilde, 1002 S. Jason St., Denver, Colo.
Filed Sept. 4, 1959, Ser. No. 838,083
6 Claims. (Cl. 198—95)

This invention relates to portable belt-type conveyors and, more specifically, to a conveyor of the class described that is characterized by two or more angularly adjustable and telescopable sections having a novel swivel connection therebetween.

Lightweight portable conveyors fabricated from thin wall tubing of the type commonly used in the aircraft industry have become quite common in recent years, especially in the building trades where it is essential that they be moved from place-to-place quite often. These units customarily comprise a single straight section of fixed length and are primarily used to raise various types of loads from one level to another. While conveyors of this type are manufactured in varying lengths depending upon their particular application, a practical maximum, of course, exists compatible with portability, structural rigidity, weight, compactness and load-carrying capacity. Generally speaking, this maximum practical length is considered to be about thirty-five feet although units fifty feet long or more have been made for special purposes.

A number of applications exists, however, where conveyors considerably longer than it is possible to achieve with a single section unit of the type just described are needed, yet where portability or mobility are still desirable characteristics. For example, it is often necessary to convey packaged materials and the like from a stack thereof to a point of use located a considerable distance away, although at only slightly higher elevation. Unfortunately, the prior art portable belt-type conveyors do not provide a satisfactory solution to this problem and other material-handling equipment must be substituted therefor, such as, fork-lift trucks, hand trucks and permanent or semi-permanent conveyors.

In stacking operations, in particular, these fixed-length single-section portable conveyors are of little use as they must be relocated too frequently in order to compensate for the continual variation in the height, length and width of the stack. With a fixed-length unit, a stack height is rather quickly reached beyond which the conveyor is incapable of elevating the material. Even if the stack height does not rise above that which can be handled with the conveyor, as the stack approaches the foot of the conveyor the latter must be moved or the angle of inclination above the horizontal will become too steep. Similarly, as in the case of a ladder, the foot of the conveyor must be shifted laterally along the base of the stack whenever the top is moved, otherwise, an unbalanced condition would exist.

Accordingly, a much more versatile portable conveyor than that of the single-section fixed-length type aforementioned, would be one that included a plurality of sections that could either be used singly or connected together in end-to-end relation whenever the necessity arose to carry materials a greater distance than the length of a single section. Also, such a unit should preferably include a coupling between sections that would provide for relative angular movement therebetween both vertically and sideways, yet which would not interfere with the transfer of the conveyed material from section to section. Furthermore, a really versatile conveyor of this type would have an adjustable connection between sections that would permit relative telescopic movement in a direction to change the overall length thereof.

Accordingly, it is the principal object of the present invention to provide a novel and improved portable conveyor.

A second object is to provide a conveyor of the class described that comprises a plurality of detachable sections that can be used either singly or in combination with one another.

Another objective of the invention is the provision of a novel coupling between adjacent ends of the conveyor sections that permits relative angular movement therebetween in both a vertical and horizontal plane.

Still another object is to provide a conveyor assembly in which the coupling between sections thereof permits relative telescopic movement therebetween to vary the overall length.

A further objective of the claimed invention is to provide a conveyor assembly that is ideally suited for stacking, elevating, loading and unloading operations over distances that cannot be covered by the conventional single-section portable conveyors of the type most often used, yet, which does not sacrifice the desirable attributes of portability and versatillity.

Additional objects of the instant invention are the provision of multiple-section portable conveyor that is rugged, relatively inexpensive, powerful, compact and adaptable for use in transporting various types of materials, both packaged and unpackaged.

Other objectives will be in part apparent and in part pointed out specifically hereinafter in connection with the description of the drawings that follows, and in which:

FIGURE 1 is a fragmentary side elevation showing the telescopable and pivotal coupling interconnecting the overlapping adjacent ends of two adjoining conveyor sections, portions of one of the sections having been broken away to conserve space;

FIGURE 2 is a fragmentary section taken along line 2—2 of FIGURE 1 showing the details of the wedge-shaped scraper used to free the conveyor belt of debris prior to its passage around the drive roller or drum;

FIGURE 3 is a fragmentary transverse section taken along line 3—3 of FIGURE 4 illustrating the longitudinally-extending conveyor belt supporting elements and guide rollers for the edges of the belt;

Figure 4:
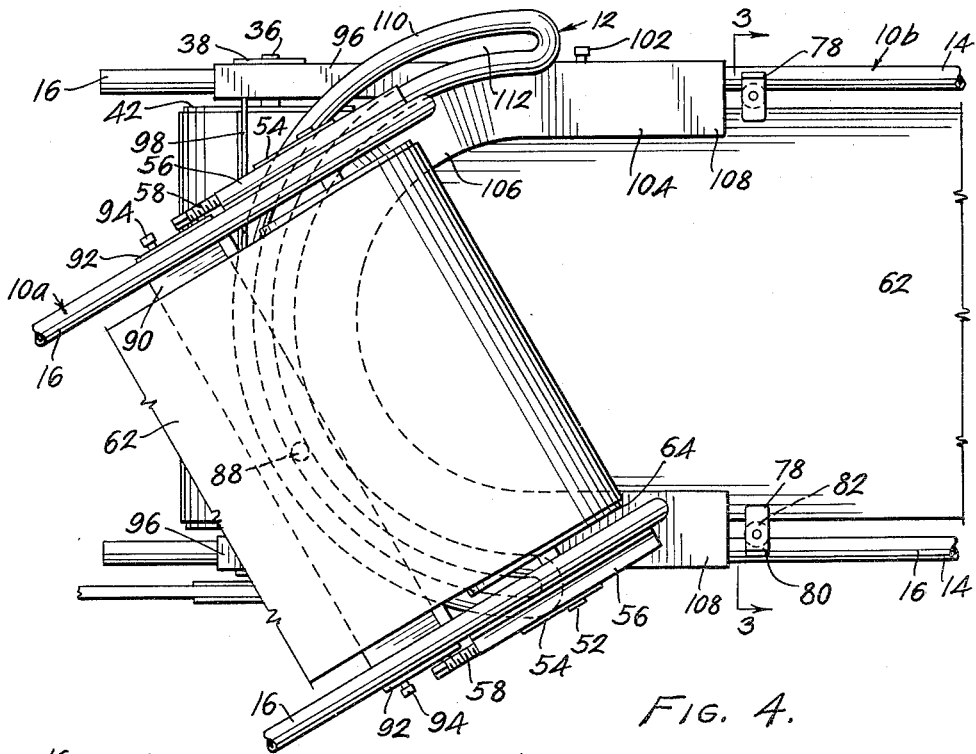
FIGURE 4 is a fragmentary top plan view showing the coupling that provides for both relative pivotal and telescopable movement between adjacent conveyor sections.

Referring now to the drawings for a detailed description of the portable conveyor assembly of the present invention, and in particular to FIGURE 1 thereof, it will be seen that it comprises two or more substantially identical sections 10a and 10b arranged in end-to-end overlapping relation with an openable coupling therebetween that has been designated broadly by numeral 12 and which provides for both relative pivotal and telescopable movement of the sections in a manner that will be set forth presently. Each of the conveyor sections 10 is preferably fabricated for the most part from lightweight tubing of the type used in the construction of airframes and will be seen to include spaced substantially parallel sides 14 formed from a single length of tubing bent to provide an upper rail 16, a generally semicircular front end 18, a bottom rail 20 and an upturned rear end 22 terminating at the upper rail to which it is joined. Suitable angle braces 24 interconnect the top and bottom rails of the sides and provide reinforcement therefor. The sides 14 are interconnected and maintained in spaced substantially parallel relation to one another by transverse elements 26 that extend between the bottom rails at longitudinally spaced points throughout the length thereof and by concave transverse elements 28 that interconnect the top rails in a manner to define a belt-receiving trough therebetween, as can best be seen in FIGURES 3 and 5. A plurality of transversely spaced belt-supporting elements 30 having down turned ends 32 extend longitudinally within the trough and are attached to the concave or bowed elements 28.

At least the head or feed end of each conveyor section is supported above ground level on some type of supporting frame or legs 34 which are preferably of an adjustable construction that enable the sections to be positioned at varying heights. The discharge ends are likewise preferably provided with detachable legs (not shown) that permit each section to be used alone as a self-contained conveyor assembly. Obviously, in certain applications, no legs at all would be required and they are, therefore, of the detachable type.

The feed end of each conveyor section is provided with a drive shaft 36 journaled for rotation about a transverse axis and within bearings 38 (FIGURE 6) carried by sideplates 40. A novel feed drum or roller 42 is mounted on the drive shaft for conjoint rotation therewith and will be described in detail in connection with FIGURE 5. A drive pulley 44 is also attached to the drive shaft 36 on the outside of one of the sideplates. A motor or small internal combustion engine 46 is operatively connected to the drive pulley 44 and associated drive shaft for turning the feed roller or drum 42 by means of a belt 48. It should be noted in this connection that each section contains its own drive and is, therefore, independent of the other sections. The motor or engine, in the particular form shown, is mounted upon a conventional Rockwood-type motor mount 50 that maintains a substantially uniform belt tension and need be described in no greater detail as it forms no part of the present invention.

The discharge end of each section contains a driven shaft 52 journaled within bearings 38 for rotation in longitudinally spaced substantially parallel relation to drive shaft 36. These last-mentioned bearings are mounted in slide blocks 54 that are in turn mounted for longitudinal slidable movement between the spaced substantially parallel tracks 56 of a conveyor belt tightening assembly. The latter assembly includes a screw 58 threaded through one of the fixed crossframe elements 60 of the sides 14 and engageable with the slide block to shift the driven shaft 52 relative to the drive shaft 36 thus varying the tension in the conveyor belt 62.

In FIGURES 1 and 2, it can be seen that the conveyor belt 62 is of the endless type mounted to pass around the feed drum or roller 42 located at the intake end of each section and around the idler drum or roller 64 mounted on the driven shaft for conjoint rotation therewith at the discharge end of each section. The direction of rotation of the drive roller 42 is clockwise as viewed in FIGURE 1 which feeds the belt along the top of longitudinal belt-supporting elements 30 that form the trough therefor, around the idler drum 64 and back along the underside of the conveyor frame. The support for the conveyor belt as it returns to the feed roller is provided by a plurality of roller assemblies 66 that are arranged in longitudinally spaced substantially parallel relation throughout the length of each section. These roller assemblies include a shaft 68 mounted for rotation within brackets 70 that depend from the lower rails 20 in opposed transversely spaced relation to one another, and a plurality of roller-like elements 72 affixed to the shaft in position to engage and support the underside of the belt. A V or wedge-shaped scraper 74 is attached between the sides 14 of each section immediately ahead of the roller assembly nearest the feed drum 42. The angularly disposed legs 72 or scraper 74 have the apex formed therebetween pointing in the direction of idler roller 64 and in position to sweep debris from the upper surface of the belt as it returns to the feed drum.

FIGURE 3 of the drawings shows the belt-guide assemblies 78 that are mounted on the top rails 18 of the frame sides 14 and function to maintain the belt within the trough formed therebetween. These belt-guide assemblies include generally U-shaped brackets 80 that open in a direction to receive the adjacent edge of the belt 62. Rollers 82 are mounted for rotation between the spaced legs of the U-shaped brackets and are positioned therein to engage and roll along the edges of the belt as shown.

Figure 5:
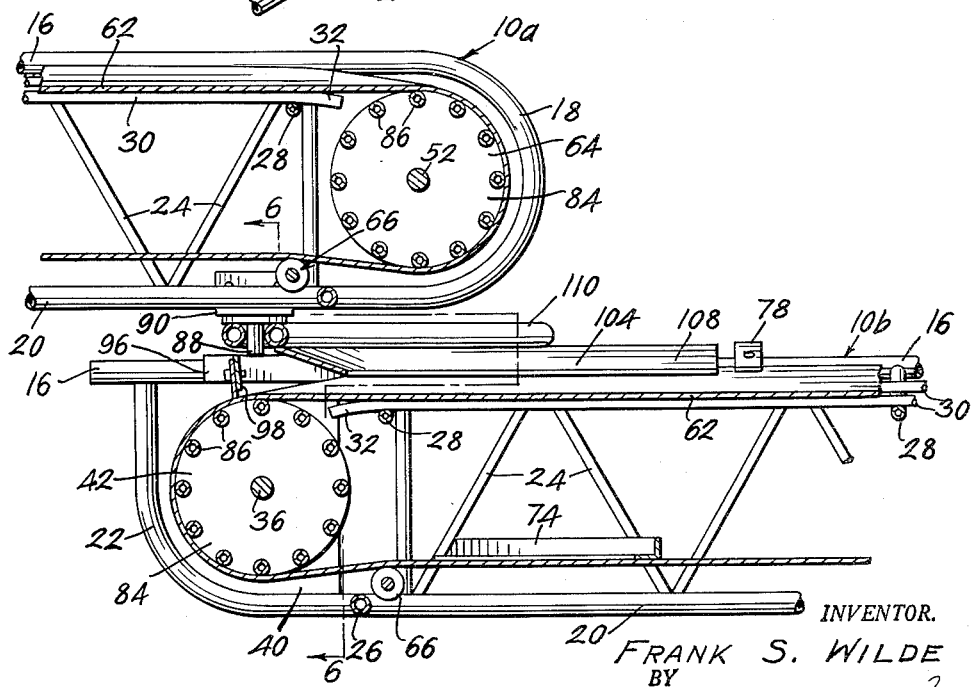
FIGURE 5 is a fragmentary view similar to FIGURE 1 but showing the overlapping adjacent ends of the adjacent conveyor sections and the coupling therebetween in longitudinal section rather than elevation.
Figure 6:
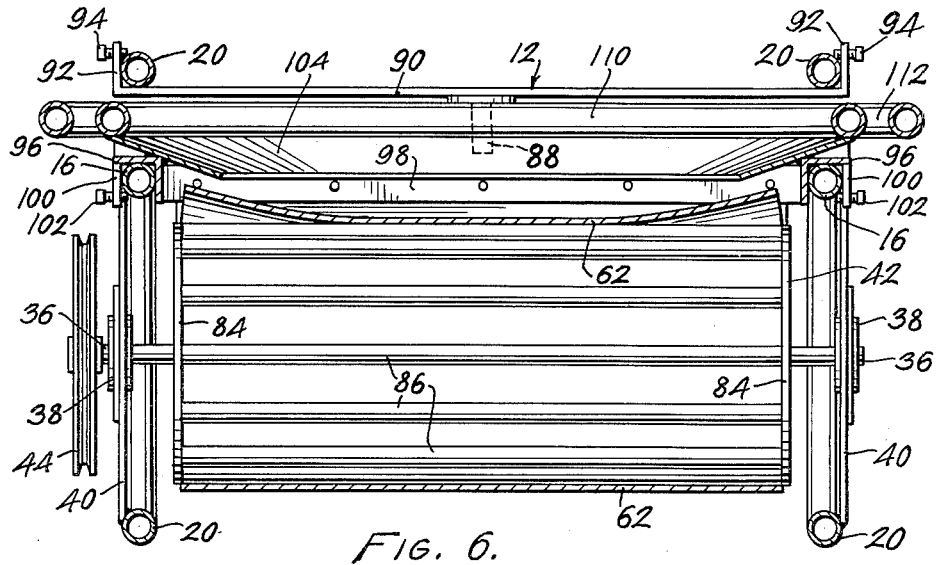
FIGURE 6 is a section taken along line 6—6 of FIGURE 5.
Figure 7:
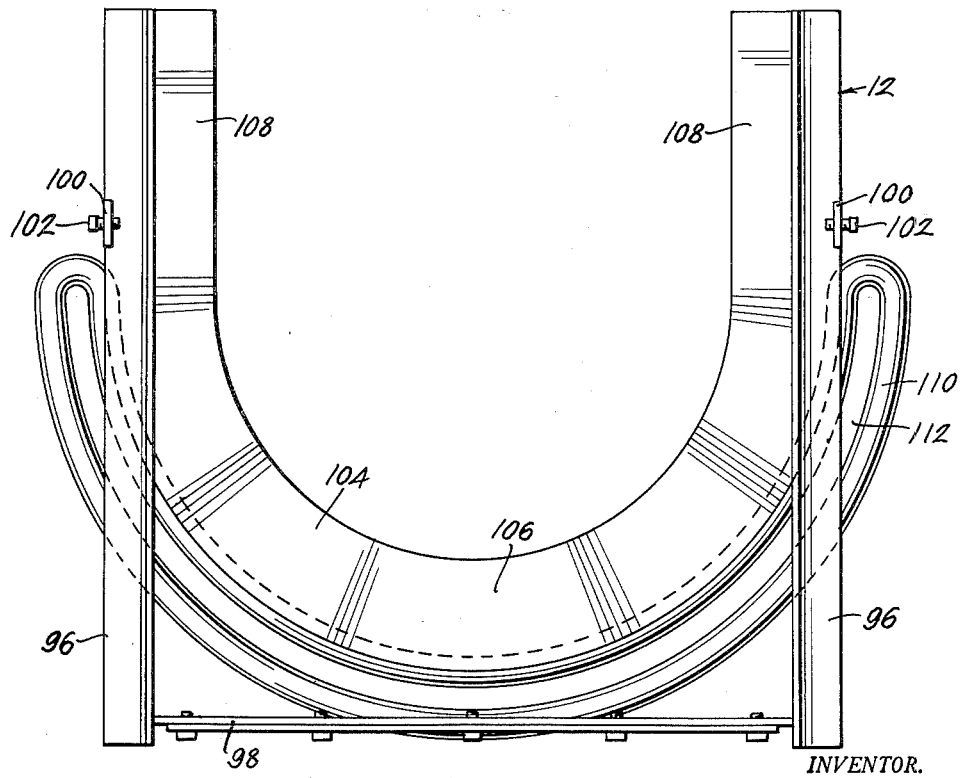
FIGURE 7 is a bottom plan view showing the slidable portion of the coupling that provides for relative telescopable movement of the overlapping conveyor sections in addition to relative pivotal movement.

FIGURES 5 and 6 best illustrate the construction of the feed and idler drums or rollers 42 and 64 which will be seen to comprise a pair of circular disks 84 mounted in transversely spaced substantially parallel relation to one another adjacent opposite ends of their respective shafts 36 and 52 and in position to turn between the sides 14 of the frame. These disks are interconnected along the circumference or periphery thereof by a plurality of substantially equi-angularly spaced rods or tubes 86 that define with one another a generally cylindrically-shaped surface having transverse slots or openings therein for the passage of small stones and other debris that might otherwise be trapped between the drum and belt damaging the latter. In time, any debris falling through the slots into the interior of the drum will tumble around and work its way back out again when it is discharged over the side of the belt. This feature is of advantage in eliminating undue wear and tear on the belt, especially when the conveyor is being used to handle granular materials such as gravel and the like.

One of the most significant features of the present invention is that which has been illustrated in FIGURES 4–7, inclusive, to which reference will now be had for a detailed description of the coupling 12 between the overlapping adjacent ends of the conveyor sections. This coupling will be seen to include a downwardly projecting pin 88 depending from the underside of conveyor section 10a and located adjacent the discharge end thereof intermediate the sides 14. The particular means by which the pin is attached to the conveyor section comprises a metal plate or strap 90 of a length to extend transversely to the outside of the bottom rails 20 where it is provided with upturned end portions 92 having inwardly projecting setscrews 94 threaded therein which are positioned and adapted to engage the bottom rails above the center thereof.

The upper surface of conveyor section 10b adjacent the feed or intake end thereof is provided with a pair of angle iron sections 96 spaced to overlie the top rails 16 for slidable movement thereon in the direction of their length. The free ends of the angle iron sections are interconnected as shown by a transverse strut 98 that maintains the fixed spaced relation therebetween. Ears 100 depend from the free edges of the angle iron sections and extend downwardly therefrom in position to slide along the outside of the outside of the top rails. Setscrews 102 are threaded through the ears in position to engage the top rails below the center thereof and thus provide locking means adapted to maintain the angle irons and associated assembly soon to be described in adjusted position along the top rails.

Resting on top of the angle iron sections and welded or otherwise permanently affixed thereto is a generally horseshoe-shaped tray 104 overlying the feed or intake end of the conveyor belt 62. This tray is formed from sheet metal and includes a semi-circular section 106 extending across the belt between the angle iron sections and a pair of transversely spaced legs 108 projecting forwardly from section 106 along the angle irons. The upper surface of both the legs and semicircular section of the tray slope downwardly and inwardly such that any material falling thereon will be directed into the conveyor belt.

The semicircular section 106 of the tray is bordered on the outside edge thereof by a semicircular track 110 having a similarly shaped slot 112 therein adapted to receive pin 88 depending from the underside of the other conveyor section 10a. In the particular form shown, the track 110 is formed from two semicircular lengths of tubing arranged in radially-spaced concentric relation and interconnected at their free ends.

Now, by referring specifically to FIGURE 4, it can be seen that with the pin 88 depending from the discharge end of conveyor section 10a positioned within the groove 112 in the semicircular track resting on the intake end of conoveyor section 10b, the first-mentioned section can swing laterally from side-to-side and also up and down a limited amount relative to the other of said sections. Note that in any of these relative angular positions of the conveyor sections, the belt of the lead section 10a is located to discharge onto the belt of the following section 10b. The tray functions to direct any material from section 10a back onto the belt of section 10b rather than letting it fall over the side. Also, by loosening the setscrews 102, the following conveyor section 10b can be telescoped underneath the lead section 10a as the track 110, tray 104 and angle iron sections 96 are free to slide substantially the full length of the section to which they are adjustably attached. Thus, when it is desirable to use the assembly to convey materials a distance less than a whole number multiple of the length of a single section, it is only necessary to adjust the coupling 12 in a manner to shorten the overall length of the unit.

Having thus described the several useful and novel features of the portable conveyor assembly of the present invention in connection with the accompanying drawings, it will be seen that the several worthwhile objectives for which it was designed have been achieved. While only a single specific embodiment of the invention has been illustrated in the drawings and described in connection therewith, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. A portable conveyor assembly comprising, at least two conveyor sections arranged in end-to-end overlapping relation and having a coupling therebetween detachably interconnecting same for both relative pivotal and telescopable movement, each of said conveyor sections including a frame having spaced substantially parallel sides extending in the direction of the length thereof, a drive drum and a driven drum journaled for rotation between the sides at opposite ends thereof and in spaced substantially parallel relation to one another, an endless conveyor belt mounted on the drums for movement in response to rotational movement of the latter, and drive means operatively connected to the drive drum for rotating same, and said coupling comprising a single centrally-located pin and a track having an uninterrupted substantially semicircular slot therein sized and adapted to receive the pin for arcuate slidable movement from end-to-end thereof, one of said pin and track elements being attached to the lead section of the conveyor assembly adjacent the discharge end thereof and the other of said elements being mounted on the following section for adjustable movement in the direction of its length.

2. The portable conveyor assembly as set forth in claim 1 in which the pin depends from the underside of the lead conveyor section adjacent the discharge end thereof and intermediate the sides, and the track rests on the upper surface of the following conveyor section for slidable movement between the intake and discharge ends thereof, said track comprising a pair of generally U-shaped tubular elements arranged in substantially concentric radially spaced relation with their free ends interconnected to define therebetween the semicircular slot.

3. The portable conveyor assembly as set forth in claim 2 in which a generally horseshoe-shaped pan depends from the track in position to overlie the conveyor belt of the following conveyor section, the upper surface of said pan being sloped downwardly and inwardly in a manner to deliver material deposited thereon from the lead conveyor section to the belt of the following conveyor section.

4. The portable conveyor assembly as set forth in claim 2 in which the track comprises a pair of elongate elements having a generally semicircular shape of different radius arranged in substantially concentric relation thus defining the pin-receiving slot therebetween which is of a width to receive the pin for limited tiltable movement therein.

5. The portable conveyor assembly as set forth in claim 2 in which the track is mounted on a pair of transversely spaced substantially parallel track-supporting elements having a generally channel-shaped cross section that opens downwardly and is adapted to receive the sides of the frame for longitudinal slidable movement therein, and fastening means are carried by at least one of said track-supporting elements for movement into the channel thereof and into engagement with that portion of the frame housed therein to maintain an adjusted position therebetween.

6. The portable conveyor assembly as set forth in claim 3 in which the opening between the legs of the horseshoe-shaped tray is slightly narrower than the width of the belt, and said legs overlie and extend laterally beyond the edges of the belt.

References Cited in the file of this patent

UNITED STATES PATENTS

| | | |
|---|---|---|
| 313,404 | Good | Apr. 17, 1885 |
| 1,359,582 | Dolton | Nov. 23, 1920 |
| 1,821,664 | Peiler | Sept. 1, 1931 |
| 2,157,301 | Neuman | May 9, 1939 |
| 2,789,682 | Laskauskas | Apr. 23, 1957 |
| 2,889,913 | Boersma | June 9, 1959 |